United States Patent
Kaftan et al.

(10) Patent No.: US 9,665,947 B2
(45) Date of Patent: May 30, 2017

(54) METHOD AND APPARATUS FOR REGISTRATION OF MULTIMODAL IMAGING DATA BY USING A CENTER LINE TO OPTIMIZE QUALITY OF ALIGNMENT

(71) Applicant: Siemens Medical Solutions USA, Inc., Malvern, PA (US)

(72) Inventors: Jens Kaftan, Oxford (GB); Marin Kopaczka, Neuss (DE)

(73) Assignee: Siemens Medical Solutions USA, Inc., Malvern, PA (US)

( * ) Notice: Subject to any disclaimer, the term of this patent is extended or adjusted under 35 U.S.C. 154(b) by 59 days.

(21) Appl. No.: 14/503,772

(22) Filed: Oct. 1, 2014

(65) Prior Publication Data

US 2015/0093008 A1    Apr. 2, 2015

(30) Foreign Application Priority Data

Oct. 1, 2013    (GB) .................................. 1317397.6

(51) Int. Cl.
   *G06K 9/00*    (2006.01)
   *G06T 7/33*    (2017.01)

(52) U.S. Cl.
   CPC .... *G06T 7/344* (2017.01); *G06T 2207/10081* (2013.01); *G06T 2207/10104* (2013.01);
   (Continued)

(58) Field of Classification Search
   CPC ......... G06T 2207/30008; G06T 7/0012; G06T 2207/10081; G06T 2207/30172;
   (Continued)

(56) References Cited

U.S. PATENT DOCUMENTS

2006/0120583 A1*    6/2006    Dewaele ............... G06T 3/0068
                                                        382/128
2006/0228009 A1*    10/2006    Fidrich ................. G06T 7/0083
                                                        382/128
(Continued)

FOREIGN PATENT DOCUMENTS

EP        2 136 332 A1    12/2009
WO    WO-2006/050102 A2    5/2006

OTHER PUBLICATIONS

Shi et al., Pulmonary nodule registration in serial CT scans based on rib anatomy and nodule template matching, NIH Public Access Author Manuscript Med Phys. Author manuscript; available in PMC Sep. 11, 2009 pp. 1-27, Published in final edited form as: Med Phys. Apr. 2007 ; 34(4): 1336-1347.*

(Continued)

*Primary Examiner* — Vu Le
*Assistant Examiner* — Guillermo Rivera-Martinez
(74) *Attorney, Agent, or Firm* — Schiff Hardin LLP

(57) ABSTRACT

In a method for improving alignment between representations of a same elongate feature in first and second images, the images are provided to a processor and the processor derives a centerline from image data representing an elongate anatomical feature in the first image, and derives a value of a metric indicating a present quality of alignment of the centerline with image data of the second image representing the same anatomic feature. The processor optimizes the metric to provide a rigid transform, and applies the rigid transform to the centerline or the second image to improve the alignment between the first and the second image with respect to the elongate feature.

28 Claims, 7 Drawing Sheets

(52) U.S. Cl.
CPC .............. *G06T 2207/10108* (2013.01); *G06T 2207/20221* (2013.01); *G06T 2207/30008* (2013.01); *G06T 2207/30172* (2013.01)

(58) Field of Classification Search
CPC G06T 2207/10104; G06T 2207/20221; G06K 2209/055
See application file for complete search history.

(56) References Cited

U.S. PATENT DOCUMENTS

| | | | |
|---|---|---|---|
| 2007/0223795 A1* | 9/2007 | Qing | G06T 7/0091 382/128 |
| 2008/0247622 A1* | 10/2008 | Aylward | A61B 19/52 382/131 |
| 2009/0264753 A1* | 10/2009 | von Schulthess | A61B 5/0263 600/431 |
| 2010/0032575 A1* | 2/2010 | Iagaru | A61B 6/032 250/362 |
| 2010/0061611 A1 | 3/2010 | Xu et al. | |
| 2010/0128954 A1* | 5/2010 | Ostrovsky-Berman | G06T 7/0081 382/131 |
| 2011/0026794 A1 | 2/2011 | Sundar et al. | |
| 2011/0286630 A1* | 11/2011 | Harder | G06T 15/08 382/103 |
| 2012/0106810 A1* | 5/2012 | Ramakrishnan | G06T 7/0042 382/128 |
| 2013/0004044 A1* | 1/2013 | Ross | G06T 7/0016 382/131 |
| 2013/0077841 A1* | 3/2013 | Wu | G06K 9/6207 382/131 |
| 2013/0094745 A1 | 4/2013 | Sundar | |
| 2013/0101197 A1* | 4/2013 | Kaftan | G06T 5/00 382/131 |

OTHER PUBLICATIONS

Wu et al., "A Learning Based Deformable Template Matching Method for Automatic Rib Centerline Extraction and Labeling in CT Images," IEEE Conference on Computer Vision and Pattern Recogition (CVPR), (20012) pp. 980-987.

Even-Sapir et al., "The Detection of Bone Metastases in Patients woth High-Risk Prostate Cancer: 99m Tc-MDP Planar Bone Scintigraphy, Single- and Multi-Field-of-View SPECT, 18 F-Fluoride PET, and 18F-Fluoride PET/CT," The Journal of Nuclear Medicine, vo. 47, No. 2 (2006) pp. 287-297.

Kiraly et al. "A Novel Visualization Method for the Ribs within Chest Volume Data," Proc. of SPIE, Vo. 6141 (2006) pp. 614108-1-614108-8.

Kelly et al. "SUVref: Reducing Reconstruction-Dependent Variation in PET SUV," EJNMMI Research (2011) pp. 1-11.

Mundy, "Mestasis to Bobe: Causes, Consequences and Therapeutic Opportunities," Nature Reviews/Cancer, vol. 2 (2002) pp. 584-593.

Besl et al., "A Method for Registration of 3-D Shapes," IEEE Trans. on Pattern Analysis and Machine Intellegence, vol. 14, No. 2 (1992) pp. 239-256.

\* cited by examiner

N=1

N=3

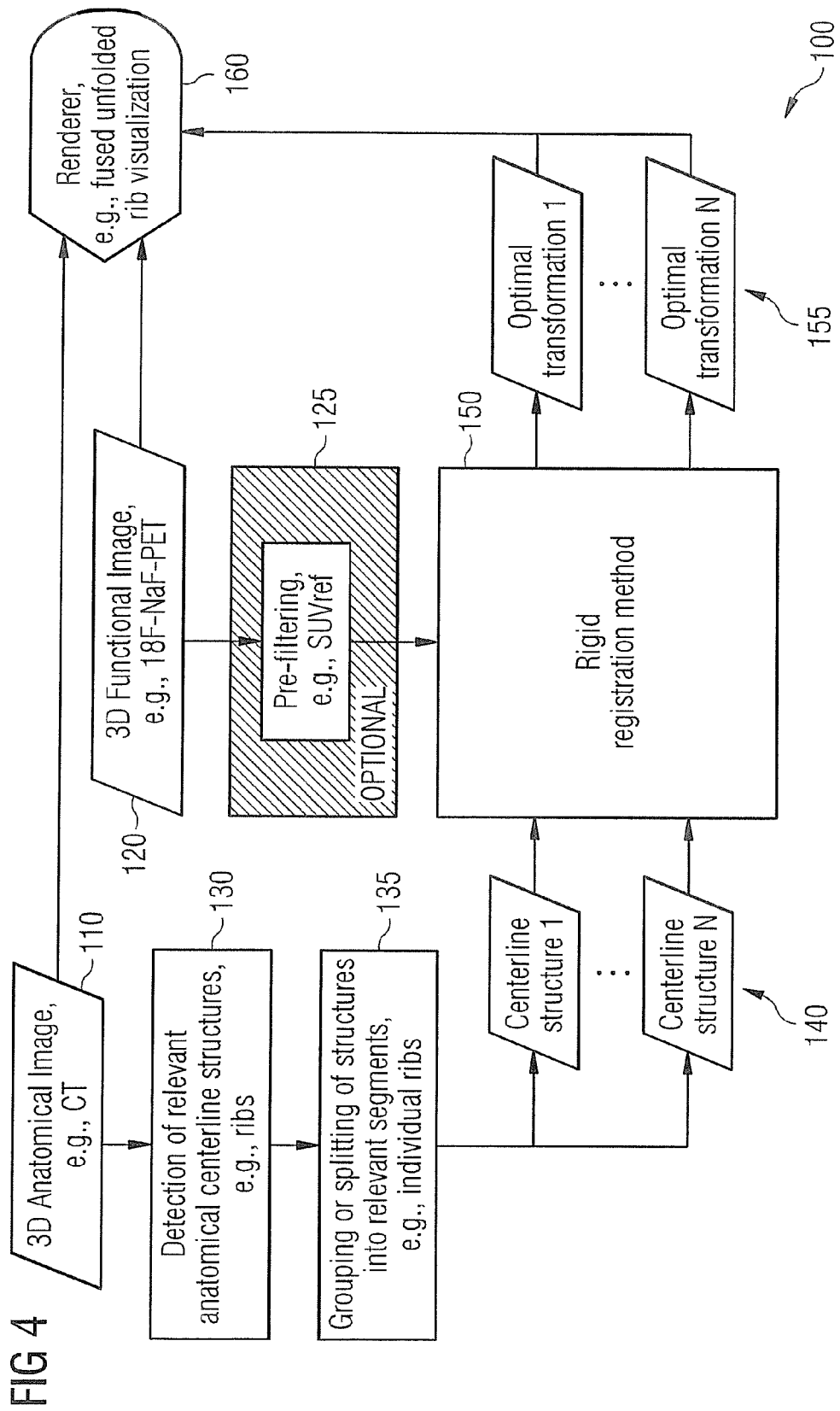

METHOD AND APPARATUS FOR REGISTRATION OF MULTIMODAL IMAGING DATA BY USING A CENTER LINE TO OPTIMIZE QUALITY OF ALIGNMENT

BACKGROUND OF THE INVENTION

Field of the Invention

The present invention relates to methods for improving registration between images, for example images generated by different imaging modalities. It particularly relates to the registration of medical images, typically the registration of an anatomical image with a functional image.

Description of the Prior Art

The present invention particularly relates to the registration of such images in respect of essentially elongate features, and more especially to such images of ribs of a patient.

As used within the present document, the following abbreviations may carry the following meanings:

CT Computed tomography
PET Positron emission tomography
SPECT Single-photon emission tomography
MIP Maximum intensity projection
SUV Standardized Uptake Value
$^{18}$F-NaF $^{18}$F-Sodium fluoride
$^{99m}$Tc Technetium-99m Typically, CT and PET imaging data are acquired together, in a single dual-mode scanner. Anatomical information gained from the CT data can be supplemented by functional information provided by the PET image data. Therefore, combining the data from both sources may increase the diagnostic conclusiveness of the images. The CT image may be used to estimate the attenuation effects in the PET image, and to guide some compensation for these attenuation effects in later image data analysis.

The CT data acquisition may be performed before the PET data acquisition begins. Typically, a CT image is generated by data acquired over a few seconds, while a PET image represents data acquired over several minutes. It is not possible for the patient to remain immobile for the length of time taken to assemble the PET data, at least due to the motion involved in breathing. The misalignment will be of the order of a few millimeters. This will typically be an insignificant misalignment when looking at relatively large features of a patient, such as the heart or lungs. However, when imaging finer features, such as ribs or vessels for example, such misalignments may become significant. Hence, this inherent "scanner alignment" provided by the hardware arrangement has known limitations.

It is possible to attempt to realign the images with respect to one another to reduce the misalignment of features, by relatively moving one image by way of translation and/or rotation, for example. Such "global alignment" may provide a useful reduction in misalignment for structures whose internal configuration remains identical in both images.

However, for fine features such as ribs or vessels, the features are to some extent moveable with respect to one another, so the relative positions of the features in one of the images may be different from the relative positions of those features in the other image. It is then difficult to achieve acceptable alignment in the inherent scanner alignment. It is also difficult to improve the alignment between the two images by global alignment, as a translation and/or rotation which provides an improvement in the alignment of one rib, for example, may in fact degrade alignment of another rib.

Although one image may be scaled and distorted to provide a better fit to the other, it is preferred not to distort medical imaging data, as the required information may be distorted or lost.

While the present invention may be applied to elongate anatomical features other than ribs, for example the spine, or vessels, the following description will make especial reference to ribs, in the interests of brevity and clarity.

It is known that images of ribcages may be "unfolded" to generate a more-easily understood 2-dimensional image from 3-dimensional anatomical data. WO2006/050102 describes the "unfolding" of CT imaging data relating to the ribcage. The CT imaging data provides anatomical information: information relating to the bone structure of the ribcage. The centerline of each rib is extracted. Then, for each rib a 2D projection of its centerline is visualized. Lesions and corresponding rib information are easier to determine in such an "unfolded" image than in the original 3D image data.

While CT and similar "anatomical" image data usefully indicate the bone structure of a patient, other "functional" imaging modalities such as PET or SPECT are more effective at detecting lesions within the bones. On the other hand, such functional imaging modalities are less effective at detecting the bone structure. Bone metastases are common with certain cancer types, and the present invention relates to improved methods for identifying and locating such features. Throughout the present description, the term "PET" will be used to refer to PET or SPECT, in the interests of brevity.

US2013/0101197 defines an improved method whereby "unfolded" images may be generated, which combine the anatomical information with the functional information. By segmenting the functional image data according to the rib locations identified by the anatomical image data, separate images of each rib may be generated. These may in turn be projected along the calculated centerline of each rib to provide a single 2D image representing a MIP (maximum intensity projection) of the functional data overlaid on an average value of the anatomic data. Such combined images make the identification of affected ribs relatively easy.

However, this method has been found to suffer from certain drawbacks.

The alignment between the representations of the ribs in the functional image may not sufficiently correspond to the alignment of the ribs in the anatomical image. Although the ribs themselves may be considered solid, and may be assumed to have retained a same shape between the two images, their relative locations may be different between one image and the other. The anatomical image and the functional image will typically have been captured at different times, even if those times are typically quite close together. The patient's breathing, or other movement, may cause relative movement between the ribs, and may cause the ribs to be in different relative positions in the functional image than they were in the anatomical image.

When one uses the method of US2013/0101197, the shapes of the individual ribs identified in the anatomical image are used to identify parts of the functional image which represent corresponding ribs. Where the ribs are in different relative positions in the two sets of image data, the parts identified in the anatomical data will not correctly align with the representation of the ribs in the functional data.

The described rib centerline detection is usually applied only to the CT data. Combining CT with corresponding PET data would allow better identification of potentially cancerous areas of bones than is possible using only CT data. The time-averaging effect of the long PET exposure time may result in significant differences between the position of each rib in the PET and CT images. This is illustrated in FIGS. 1A and 1B. FIG. 1A shows detected centerlines 10 on the original CT image 15, while FIG. 1B illustrates the same centerlines 10 mapped onto the corresponding scanner-aligned PET image data 20. Using the CT centerlines 10 to create an unfolded view of the PET image 20 may accordingly result in a severely misaligned PET projection.

Inaccuracies in image alignment may complicate the visual correlation of functional (e.g. PET) and anatomical (e.g. CT) information in regions of interest or impede an unambiguous anatomical localization of regions with increased PET tracer uptake. This may lead to the resultant combined image indicating a lesion in an incorrect position, on the wrong rib, or not identifying it at all.

The present invention allows improved alignment between data representing the same rib in both the anatomical image and the functional image.

The present invention provides an alignment method which is robust to variations in PET scanning protocol, such as the use of a reconstruction method, or a post-filter. To increase its reliability, PET data can be pre-processed using an image filter to compensate for different effects caused by the scanning procedure used. This may provide a more consistent appearance in data from different scanners or reconstruction protocols. Such pre-processing steps are known in themselves, and known methods may be used, such as those known as an algorithm named SUVref, described in US2010/0290680. SUVref allows lowering of the effect of a reconstruction protocol and an increase in comparability of PET images that have been reconstructed with different parameters. It processes the images by applying a reconstruction-dependent Gaussian smoothing.

A technique for the automatic extraction of rib centerlines has also been proposed in US2013/0077841 or Wu, D., et al., "*A learning based deformable template matching method for automatic rib centerline extraction and labeling in CT images*" *IEEE Conference on Computer Vision and Pattern Recognition (CVPR)*, 980-987 (2012).

Known techniques for functional imaging of bone lesions uses $^{18}$F-NaF PET/CT or $^{99m}$Tc SPECT/CT imaging (Even-Sapir, E., Metser, U., et al., *Journal of Nuclear Medicine* 47(2), 287-297 (2006)).

SUMMARY OF THE INVENTION

An object of the present invention is to improve known techniques of the type described above, so as to provide improved alignment between separate images of the same patient, such as between anatomical image data such as CT data, and functional image data, such as PET data. This object is achieved in accordance with the present invention by a method for improving alignment between representations of the same elongate feature in a first image and a second image, wherein the first and second images are provided to a computerized processor and the processor automatically derives a centerline from image data representing the elongate anatomical feature in the first image, and the processor derives a value of a metric indicating a present quality of alignment of the centerline with image data of the second image representing the same anatomical feature. The metric is optimized in the processor to provide a rigid transform, and the rigid transform is applied to the centerline, or to the second image, to improve the alignment between the first and second images with respect to the elongate feature. The aligned first and second images are made available at an output of the processor in an electronic form that allows the aligned first and second images to be visually presented at a display, with the improved alignment.

While the present invention may be applied to elongate anatomical features other than ribs, for example the spine, or vessels, the following description will make especial reference to ribs, in the interests of brevity and clarity.

BRIEF DESCRIPTION OF THE DRAWINGS

FIG. 4 illustrates a flow chart of a method comprising a method according to the present invention.

DESCRIPTION OF THE PREFERRED EMBODIMENTS

The present invention proposes a rib-specific multimodal registration algorithm. Use of such algorithm provides a method which optimally aligns anatomical data and functional data along each individual rib, independently of the imaging data representing other ribs and other parts of the patient's body.

The derivation of rib centerlines in itself may proceed using the algorithm proposed by Wu in the paper referenced above. The rib centerlines are calculated from the anatomical data, such as CT data in the example presented here, which provides a better representation of the physical structure of the rib than is available from functional data such as PET.

The present invention involves taking anatomical data of each rib separately, taking a series of points along the corresponding derived centerline of the rib, and examining the surrounding image volume of the functional image data for data which resembles an expected representation of the corresponding rib.

The method of the present invention may be applied to any elongate structures which have a meaningful centerline: such as ribs, other bones, aorta, other vessels, spine, colon.

According to a feature of preferred embodiments of the present invention, for each rib centerline extracted from the anatomic data and the corresponding identified functional image data, a rigid transformation matrix is iteratively calculated. Such rigid transformation matrix is used to optimally align the centerline extracted from the anatomic data with the representation of the corresponding rib identified in the functional data. This is achieved by the relative three-dimensional rotation and/or translation of either the corresponding functional image data or the corresponding anatomical data, which may be represented by the calculated centerline in the anatomical representation of the rib.

Each individual rib is assumed to be non-deformable, and to move rigidly. Using this assumption, it is not necessary to solve further complex algorithms relating to deformable registration, and rigid transformation is found to be sufficient.

Figure 1A:
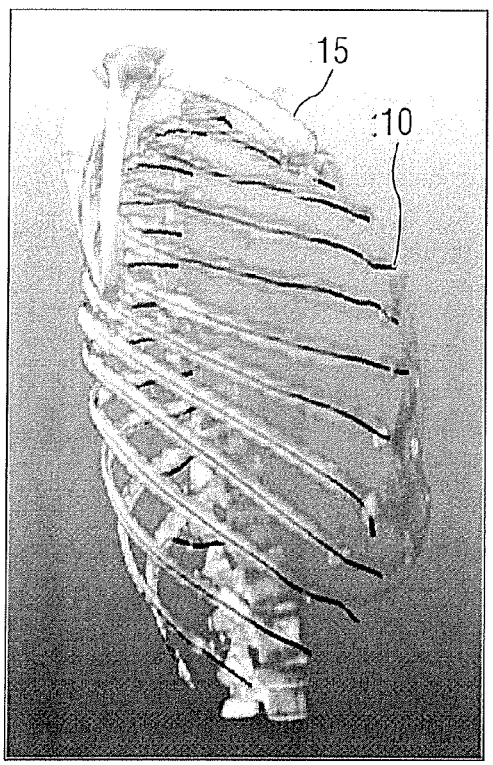
FIG. 1A shows an example CT data set, with rib centerlines derived from the CT data.
Figure 1B:
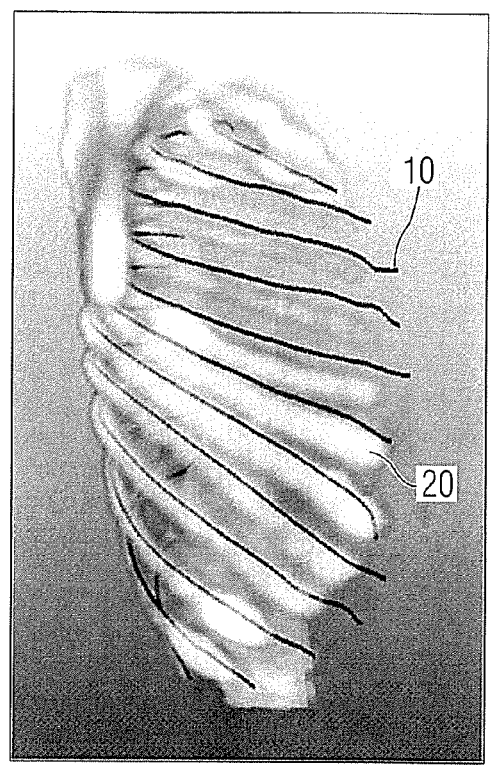
FIG. 1B shows an example PET data set, corresponding to the CT data set of FIG. 1A, upon which the rib centerlines derived from the CT data are shown.

In an example, the inherent scanner alignment provides a starting point. FIG. 1B indicates an example scanner alignment between anatomical data, here represented by derived centerlines 10, and functional image data 20.

The present invention proposes using a rib-specific registration, that is, a registration method which calculates an alignment between the centerline 10 calculated from the anatomical data relating to a single rib and the functional data relating to the same rib, without taking any account of the locations of the data representing other ribs.

Figure 2A:
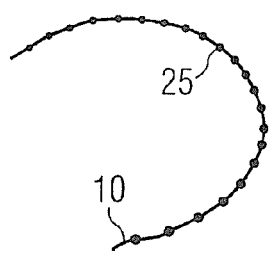
FIGS. 2A-2C represent stages in a method according to an embodiment of the present invention.
Figure 2B:
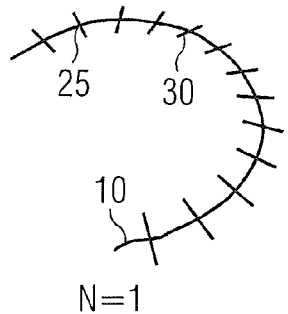
Figure 2C:
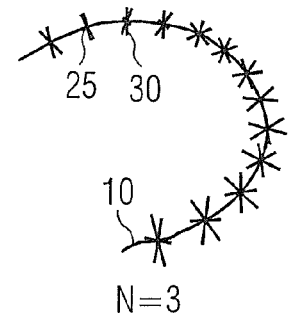

FIGS. 2A-2C represent stages in a method according to an embodiment of the present invention. According to an example method of the present invention, multiple "seed points" 25 are defined along the length of each rib centerline 10, as shown in FIG. 2A. These may for example be defined at 5 mm intervals along the rib. For each rib, and at each of the seed points 25 along the length of the derived centerline, a one-dimensional sample 30 of the functional data 20 is examined, in a direction orthogonal to the derived centerline, as represented in FIG. 2B. This sample 30 is then convolved with a matched filter, derived from an expected profile of one-dimensional data in the same direction representing a rib. Typically, a Gaussian distribution of functional data 20 is to be expected, partly due the limited scanner resolution and partial volume effects as well as to the expected movement in the corresponding part of the patient during functional imaging. A matched filter is applied which has a high response to a Gaussian data distribution, and a low response otherwise. This filter defines a centricity criterion which will be further explained below.

Figure 3A:
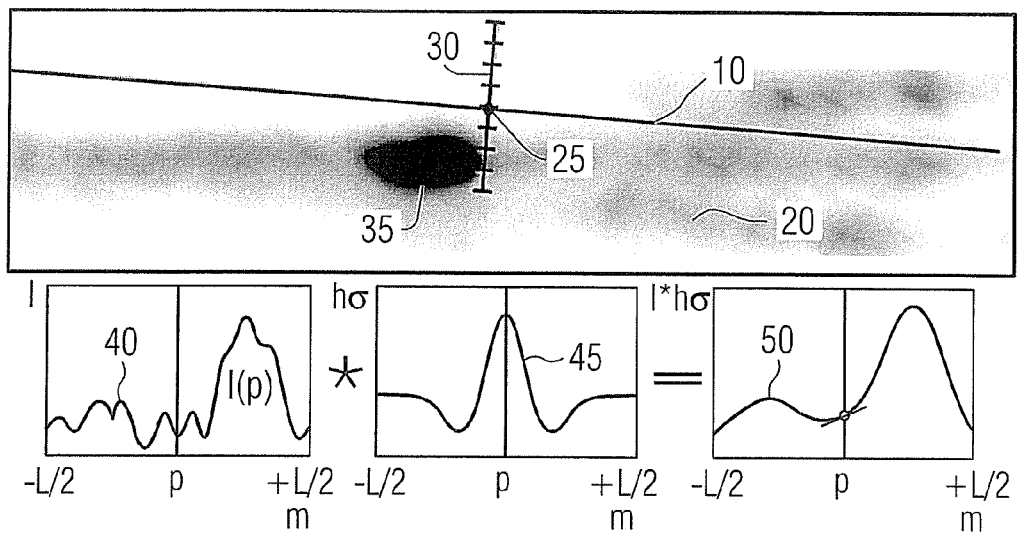
FIGS. 3A-3B illustrate an example of a matched filter calculation, as may be used in an embodiment of the present invention.
Figure 3B:
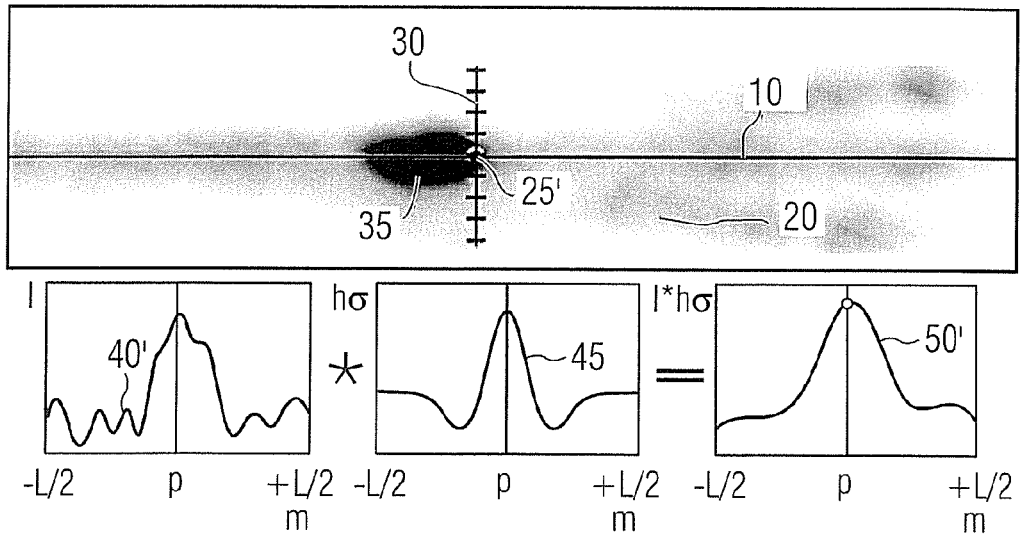

FIGS. 3A-3B illustrate an example of this calculation. In FIG. 3A, part of a derived rib centerline 10 is shown. This is representative of the anatomical data set 15. The adjacent functional data 20, aligned according to the scanner alignment, is also shown, along with a seed point 25 on the centerline 10 and a corresponding sample direction 30. As can be seen, the representation of the rib in the functional data 20 is significantly misaligned from the centerline 10.

A one-dimensional data sample 40, sampled along direction 30, is shown. The vertical line in the middle of data sample 40 represents the position p of seed point 25.

A matched filter 45 is shown. It represents a centricity criterion, and an expected profile of functional data representing a rib, in direction 30. The matched filter 45 uses a derivative of a Gaussian distribution, to reduce possible interference from background features. Again, the vertical line in the middle represents the position p of seed point 25.

Each direction 30 preferably extends perpendicular to the centerline at the respective seed point. However, other directions may be used, which extend away from the centerline in non-perpendicular directions, to sample image data 20 of the functional image in the vicinity of the centerline.

According to a feature of this embodiment of the present invention, the one-dimensional data sample 40 is convolved with the matched filter 45. The convolution result at a point represents the relative alignment—or alignment "quality"— at that point. The result of this convolution provides a single data point p, circled on filter response curve 50 in FIG. 3A. This convolution result is the minimum information required at a single seed point. Filter response curve 50 represents values of the convolution operation which would result if the matched filter were displaced along the direction 30. The line through the circled data point shows the gradient of filter response curve 50 at that point p. The whole filter response or the corresponding gradient may be calculated for each seed point 25 and each direction 30 if required by, or useful to, the optimizer.

The derived convolution results for each direction 30 at each seed point 25 are used to calculate a metric, which may be formalized as an energy function, to provide an indication of the alignment "quality" of the whole centerline 10 to the functional data 20. An extremum value of the energy function indicates that the functional data is aligned to the centerline of the anatomical data for that rib. Whether the extremum is a maximum or a minimum depends on the definition of the energy function.

Some types of optimizer may be able to use the value of the gradient of curve 50, as illustrated in FIG. 3A. For that reason, corresponding values of the gradient may be calculated and supplied to the optimizer.

The value of the energy function for that rib is provided to an optimizer. The optimizer calculates a rigid transformation to be applied to the functional data, to improve the alignment between the functional data and the anatomical data, as represented by the value of the energy function. As explained with reference to FIG. 3A, additional information may be provided to the optimizer, for example to indicate a gradient of the filter response at the seed point to indicate a preferred direction for optimization. Only some types of optimizer can make use of such information.

Typically, the anatomical and functional data sets under consideration are three-dimensional, and represent three-dimensional structures. It will typically be found insufficient to consider data in only a single direction perpendicular to the centerline (N=1) as represented in FIG. 2B. Three differing directions (N=3), for example displaced by 120° to one another in directions orthogonal to the centerline, may be considered at each point. FIG. 2C illustrates a suitable set of data sample directions. The same matched filter will be applied to each one-dimensional data sample.

The previous steps are preferably repeated, so that at least a second, and preferably also a third (N=3), one-dimensional data sample 40 is taken in a different direction 30, preferably perpendicular to the centerline 10 at the same seed point 25. This data sample is convolved with an appropriate matched filter 45, to produce a filter response 50. Filter response data representing the alignment in the second, and preferably further, directions, is acquired and supplied to the optimizer.

In the example shown, the peak is off-center in the convolution result 50. An ideal alignment would have the filter 45, the functional data 40 and the convolution result 50 all showing peaks at the center, that is, lying on the derived rib centerline. The eccentricity of the peak in the convolution result represents the offset of the functional data.

FIG. 3B illustrates an example in which the anatomical data centerline 10 and the functional image data 20 are more precisely aligned. This may be achieved as a result of a method according to the present invention. As in the example of FIG. 3A, a one-dimensional data sample 40', sampled along direction 30, is shown. The vertical line in the middle of dataset 40' represents the position of seed point 25. The one-dimensional data sample 40' is convolved with the matched filter 45. The resultant filter response 50' shows a peak aligned with the location of the seed point, as represented by the vertical line. This represents a high quality of alignment.

The energy function can be formulated in such a way that either small or high values may represent a high quality of alignment. As a consequence, the energy function shall be either minimized or maximized as appropriate to represent a high quality of alignment. The energy function will provide an indication of the misalignment between the calculated centerline 10 in the anatomic data and a functional representation of the corresponding rib 20, where one is located within the range of the one-dimensional data samples 40.

An example energy function, which may be derived from the results of the convolution of one-dimensional data samples with a matched filter as described above, may be expressed as:

$$E(A) = \sum_{p \in A} \frac{1}{\max_{i,m} I(p, v_i, m)} \sum_{i=1}^{N} \sum_{m=-L/2}^{L/2} I(p, v_i, m) h_\sigma(-m)$$

wherein $$\sum_{m=-L/2}^{L/2} I(p, v_i, m) h_\sigma(-m)$$

is the respective result of each convolution operation, p represents each seed point 25 on the centerline 10, A is the locus of three-dimensional centerline 10, I represents intensity of image data, N is the number of directions 30 in which data is sampled at each seed point 25, m indicates a position along the data sample 40, $v_i$ represents the orientation of the data sample, L+1 is the length of the data sample, $h_\sigma$ is the matched filter, preferably represented by a Gaussian kernel or its derivatives with a zero mean and a variance of $\sigma^2$, and $p \in A$ means that A is the set containing all of the points p.

This equation for energy function E(A) shows how filter response values obtained from convolving each one-dimensional sample 40 with the matched filter 45 at each seed point 25 along the centerline 10 are combined into a single value which represents the degree or quality of the three-dimensional alignment of the representations of the particular rib in the two image data sets.

The energy function, such as the energy function E(A) shown above, may be taken to indicate the quality of alignment between the anatomical image data and the functional image data for any particular rib at any particular iteration. The energy function combines the matched filter responses at all seed points and allows the optimizer to optimize alignment for a complete centerline structure.

The energy function may be used by a standard registration optimization scheme, which will iteratively calculate a rigid transformation matrix for data representing each rib individually. Application of the respective rigid transformation matrix will provide improved alignment between the anatomic data and the functional data for each rib, independently of any transform calculated for, or applied to, data representing any other rib. The rigid transformation is optimized to achieve a greatest-possible value for the energy function, in order to better align the functional data with the anatomical data as represented by the extracted centerlines 10. Each rib, taken alone, has a fixed size and shape. The rigid registration calculates an appropriate 3D rotation and/or translation which may be applied to the functional data 20 representing the rib in order to more closely align it to the centerline 10 of the rib as calculated from anatomical data 15. Use of a rigid transformation ensures that image data representing rib lesions is not deformed. Such deformation is a problem with the conventional methods discussed above, and may result in changed lesion volumes or changes in corresponding standardized uptake values (SUVs).

The calculated rigid transformation may conveniently be expressed in a rigid transformation matrix containing parameters representing translation and rotation for use in subsequent steps for visualization of data.

FIG. 4 shows a flow chart illustrating an overall method 100 of the present invention. In steps 110, 120, anatomical and functional data representing a patient's ribcage are captured.

In step 130, anatomical data representing the ribs is identified, and grouped or split into data subsets representing individual ribs, in step 135.

The functional image data may be pre-filtered, as discussed above, in an optional pre-filtering step 125 before being used in the rigid transformation calculation at step 150. Such pre-filtering may make the resulting rigid transformation more robust against variations in input SUVs, for example.

In step 140, centerlines of the ribs in each of these data subsets are extracted according to any suitable method. These steps may be conventional in themselves.

In step 150, and in accordance with an aspect of the present invention, a rigid registration method calculates an individual rigid transformation matrix for each rib, as outlined above, which is applied to the functional data representing each rib, individually, to improve the alignment of the corresponding calculated rib centerline 10 with the corresponding functional imaging data 20. The resultant optimal transformations for each rib individually are provided at step 155.

At step 160, a rib visualization algorithm, which may be conventional in itself, is used to render and visualize the ribs, using a combination of anatomical and functional data. An example rib visualization algorithm which may be used in conjunction with the method of the present invention is described in U.S. Pat. No. 7,627,159, WO 2006/050102 and Kiraly. A., Qing, S., and Shen, H., "A novel visualization method for the ribs within chest volume data" SPIE Medical Imaging, 614108-614108 (2006). Preferably, and as described in further detail below, the ribs are visualized in an unfolded state and with fused anatomical and functional data.

The rib visualization algorithm at step 160 takes as inputs: the anatomical image data 15, the functional image data 20 and the calculated rigid registration transforms for each rib 155.

As described with reference to FIGS. 3A and 3B, an initial alignment is assumed for each rib, and the convolution with a matched filter is used to improve upon that initial alignment. For each rib, an initial alignment must therefore be provided. As discussed above, the functional and anatomic data have an initial scanner alignment provided by the imaging hardware. This may be used for each rib. Alternatively a global rigid registration algorithm may be employed, which will attempt to improve the overall alignment between the two images, but will not allow for any relative movement between features, such as ribs. However, the inventors have observed that neighboring ribs move similarly, so the calculated improved alignment of one rib may be applied to a neighboring rib to provide an improved initial alignment for use as a starting point for the described matched filter convolution. This may advantageously provide faster convergence of an iterative optimization algorithm, and may reduce possible interference from functional data indicating adjacent ribs.

In an example of such a method, the data representing the uppermost ribs—hereinafter referred to as L01 and R01—are registered using the method of this invention, starting from the scanner alignment as the initial alignment. Once a rigid registration transformation has been calculated for the uppermost ribs L1, R1, those transformations may be used as an initial alignment for calculation of the rigid registration for the next ribs down L02, R02.

Similar steps are performed to calculate a rigid registration transform for each of the remaining ribs, each using the transform of a neighboring rib as an initial alignment for the convolution with the matched filter.

The process of performing convolutions of one-dimensional data samples along the rib centerlines at spaced-apart seed points, calculating a misalignment at each point, generating a corresponding energy function and a corresponding rigid transformation matrix to maximize an energy function value is repeated to further improve alignment between the centerlines 10 calculated from the anatomical data and the corresponding functional data. This iterative process may be repeated a predetermined number of times; until the energy function reaches a predetermined threshold value; or until the change in value of the energy function between one iteration and the next falls below a predetermined value.

Figure 5:
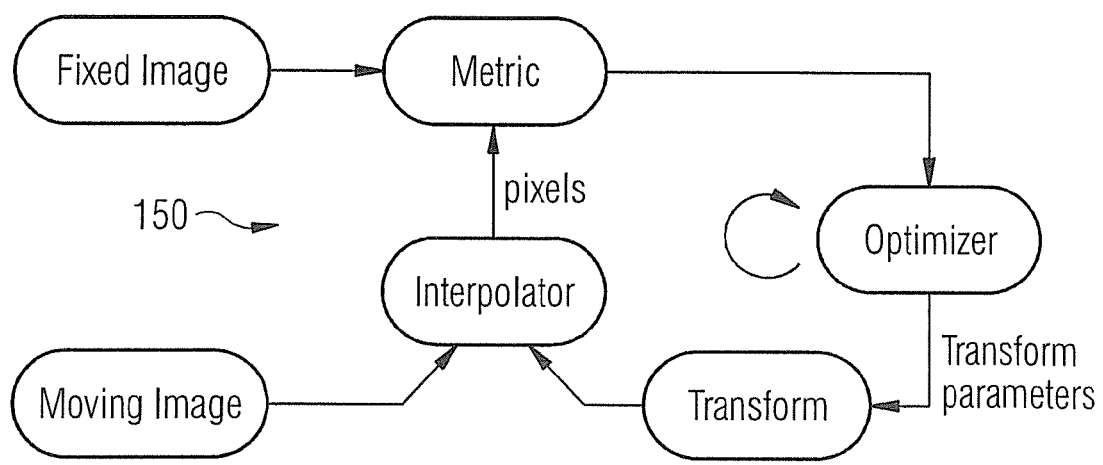
FIG. 5 illustrates a flow chart of a rigid registration method according to an aspect of an embodiment of the present invention.

FIG. 5 represents an example rigid transformation method 150 which may be used in performance of a method according to the present invention. The method uses the concept of alignment by energy function. The "fixed image" in FIG. 5 may be equated to the centerline 10 derived from the anatomical data 15, and/or the anatomical data itself. The fixed image is the reference position to which the "moving image"—the functional data 20—is to be aligned. The alignment of the functional data 20 to the anatomical data—or vice versa if preferred—is here approached as an optimization problem. As discussed above, the "metric" step in FIG. 5 involves the calculation of an energy function for each rib, representing a degree of misalignment between the two image data sets of the particular rib. The calculated energy function for a rib is provided to an optimizer which calculates a rigid transformation which, if applied to the moving image, would increase the energy value, representing an improved alignment. The optimizer provides corresponding transform parameters to a transform operator which works on the moving image. An interpolator is provided and may be used to align voxels of the moving image with voxels of the fixed image, and to provide appropriate values for interpolated voxels.

The transformed and preferably interpolated image data of the moving image is returned to the "metric" step for re-calculation of the energy function. The re-calculated energy function is provided to the optimizer for re-calculation of an appropriate rigid transformation, and so the method repeats with iteratively increasing values of the energy function until an end criterion is reached. At each iteration, the parameters of translation and rotation in the rigid registration transformation are recalculated so that alignment improves. The end criterion may be a maximum number of iterations, the energy function reaching a threshold value, or the improvement in the energy function per iteration falling below a minimum level, as examples. Once the end criterion is reached, the resulting optimal transformation is output at step 155. This may be in the form of a rigid transformation matrix of parameters describing translations and rotations.

A piecewise rigid transformation model may be applied. It takes advantage of the fact that each rib is a solid entity and therefore can be rigidly registered if centerlines 10 of the rib are represented in the anatomical data 15; the functional data 20 are defined precisely enough; and there is no non-rigid deformation induced by the time-averaging effect of the PET scan. The rigid registration can be performed separately on each rib to acquire a corresponding set of rigid transformation matrices that allow rigid transformation of all ribs, individually.

The optimization algorithm 150 will generate a suggested translation and/or rotation in the form of a rigid transformation, which may itself be expressed as a rigid transformation matrix. That will be applied to the appropriate data set, and the method run again to further improve the alignment between the two data sets representing the particular rib. The centerline and the data sets do not change their shape as a result of this transform. There is no deformation of the images. The optimizer defines a required translation and rotation separately for each rib in its own respective transform.

In alternative embodiments, the calculation of the rigid transformation may be approached the other way round: to move a centerline of the representation of the rib in the functional data 20 to better align with the anatomic data 15. However, it is generally more reliable to derive a rib centerline from anatomic data which usually provides more precise images of anatomic features. Methods of the present invention may also be employed to align images in a same modality, or at least images which are both anatomical, or both functional. Since the only operations which are applied to the image data are translation and rotation, no deformation of the images results.

Although mainly described as performing a separate alignment for each rib, an optional arrangement of the present invention could provide centerline arrangement for a subset of two or more ribs at once. In such case, though, it is still the centerlines of individual ribs which are aligned; the difference will in fact be in the treatment of the energy function and image data in the optimization algorithm.

In one embodiment, which may be particularly efficient in terms of computing power, all ribs could be evaluated and realigned together in a first pass: all centerlines 10 in the same optimization routine. Once some alignment improvement has been provided by that pass, then the set of ribs may be divided into two subsets, then the alignment optimization of the present invention may be run on each of these subsets. This may progress repeatedly, at each pass dividing each subset into smaller subsets, then optimizing each of those subsets until individual rib centerlines are aligned. In each case, a starting point is provided by the output of the previous iteration. The first iteration may use the scanner alignment as the initial alignment. It may be found that alignment of subsets containing two or four (for example) ribs may provide an alignment of sufficient quality, defined by the appropriate value of the energy function, and the alignment method may stop short of alignment of individual rib centerlines.

The invention accordingly provides a method for improving alignment between two images of a same elongate object, in which a centerline is calculated for the object as represented in a first one of the images, and an analysis is carried out at each of various seed points along that centerline to calculate a misalignment between the two images at each seed point. The results are used in an optimizer to create a rigid transformation matrix which is applied to one of the images to improve the alignment between representations of the elongate object in the two images. The present invention applies a rigid transformation, whereby it is assumed that the elongate feature, such as a rib, does not change size or shape between the two images under consideration. The image data of the second image is considered directly, by sampling data around the centerline for an expected data structure, for example using a matched filter.

The same calculation is iteratively applied until the solution converges to within a predefined tolerance. The quality of alignment may conveniently be represented as a value of an energy function.

Certain embodiments of the invention may comprise a method for aligning the individual ribs in a functional image with the corresponding anatomical image, wherein rib centerlines are computed on the anatomical image and rib centerlines are aligned to the corresponding functional image signal by computing an optimal rigid transformation for each individual rib. The registration method may employ an optimization method for which an optimized energy function comprises a filter response such as a matched filter evaluated along the centerline. Rib-specific rigid registration matrices may be considered to generate fused unfolded rib visualizations of the entire rib cage, or other visualizations if preferred.

A centerline is derived from anatomic image data representing an elongate anatomical feature. A metric is derived indicating a present quality of alignment of the centerline with image data of a second image representing the same anatomic feature. An optimizer provides a rigid transform to optimize the metric and so to improve the alignment between the centerline and the second image.

The present invention works on partitioned data sets, the partitions being based on anatomically relevant regions. In the particularly described example, each partition represents a single rib in isolation. In the unfolded ribcage views of FIGS. 6 and 7, the partitions can be clearly seen: the image data representing each rib is discontinuous with image data representing adjacent ribs. In some embodiments of the present invention, deformation of the anatomic and/or functional data may take place between the partitions based on anatomically relevant regions. In that way, a coherent image will be presented, with accurate rigid alignment of the anatomically relevant regions, and a deformable alignment of the intermediate image portions.

Figure 6:
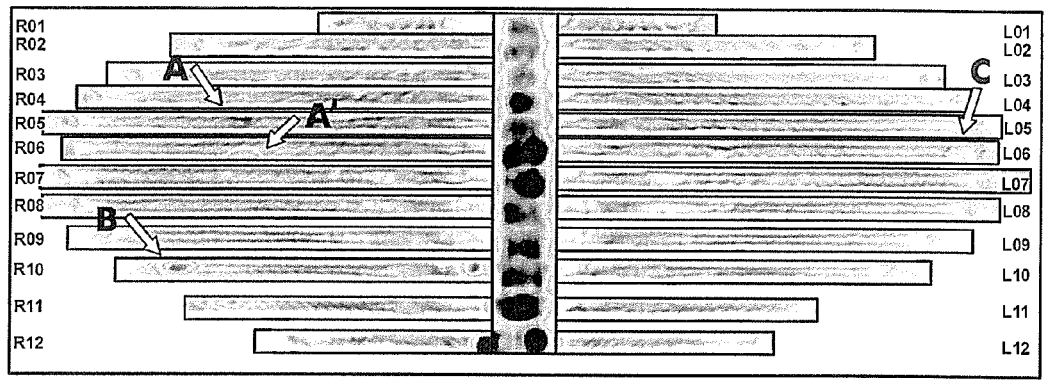
FIG. 6 shows a fused image of anatomical and functional data, according to the prior art.
Figure 7:
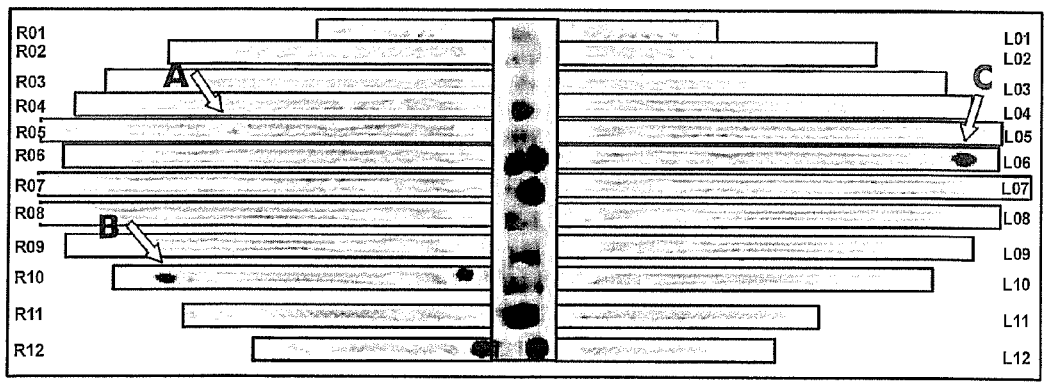
FIG. 7 shows an equivalent fused image of anatomical and functional data, using a method according to the present invention.

Although FIGS. 6 and 7 show the aligned data sets in unfolded rib configuration, other view renderings may be performed as required, and as provided by renderer 160. For example, the conventional sagittal, coronal and axial views may be provided, or other views as appropriate to the structure to be viewed. The renderer 160 is selected according to the desired visualization, and uses the derived transformations 155 to generate the appropriate visualization.

In other embodiments, continuous structures such as the aorta may be considered. As the aorta is long and not in fact rigid, the anatomically relevant regions may be contiguous, or overlapping, segments of the aorta, taken along its length, each being taken to be rigid. Some discontinuity will most likely result at the end of the alignment optimization method.

Where images of blood vessels are to be visualized, curved planar reformatting may be used, to provide an unfolded view of a viewed blood vessel.

The renderer may provide various treatments of the image data transformed by respective rigid registration transform 155. A specialized rendering may be performed, specific to the type of region aligned: rib, blood vessel, etc., or a global, deformable registration may be provided, to provide a single view of the whole image dataset realigned along elongate anatomically relevant regions according to the present invention. Interpolation of the individual rigid registration transforms 155 will be required to include data other than that included in the anatomically relevant regions of the datasets. In this way, each structure which has been aligned is visualized with its optimum alignment, but interpolated data may be displayed in a deformed state.

The present invention provides individual visualization of each rib separately, and provides the methods used in derivation of individual rigid transforms for the ribs. Preferably, the imaging data is straightened for visualization. This may be achieved by conventional methods such as described above.

According to certain embodiments of the invention, whole functional and anatomic datasets may be visualized for display, but aligned on a single selected anatomically relevant region. In an example, a single rib may be selected, for example by a mouse-click or equivalent. Both anatomic and functional data sets may be displayed, with alignment according to the optimized transform for that rib. The selected rib will be displayed with anatomic and functional data in improved alignment, although the alignment will not be as good for the remaining ribs. A user may then select a different rib, and the alignment between the displayed images may shift so that the alignment is based on the rigid registration transform 155 calculated for that rib. The alignment of that rib will be improved, but the alignment for the remaining ribs will not be as good.

Certain examples of the present invention in use will now be described, in order to clarify certain advantages the present invention may provide as compared to the prior art.

FIG. 6 shows a fused image of anatomical and functional data, resulting from a conventional method such as described in US2013/0101197 with scanner alignment. The rib images are labeled R01-R12 and L01-L12. Identified lesions A', B are visible, on ribs R06, R10. Labels A, C will be explained below.

FIG. 7 shows an equivalent image, generated from the same raw anatomical and functional data, using a method according to the present invention. In this image, lesions A, B, C are visible, on ribs R05, R10, L06 respectively.

Certain of the advantages of the present invention are exemplified in these images. Without the rib-specific registration of anatomic and functional image data as provided by the present invention, the lesion identified as A on rib R05 in FIG. 7 is incorrectly represented on rib R06 at A' in FIG. 6, using the prior art registration method. While the lesion identified as B appears on the same rib in both images, its representation in FIG. 6, according to the prior art method, is much more diffuse than in FIG. 7, according to a method of the present invention. This is caused by the sub-optimal alignment of functional imaging data with the anatomic data, leading to some data, e.g. counts in PET image data, not being taken into account for lesion B. The case of lesion C represents a worst-case scenario, where the misalignment between anatomical data and functional data means that the functional data indicating this lesion does not overlap with the anatomical data for any rib, and so it is not indicated in the combined image of FIG. 6. On the other hand, the improved alignment between anatomical and functional data provided by the method of the present invention means that the functional data representing lesion C is fully taken into account, and clearly represented on rib L06 in FIG. 7.

Figure 8:
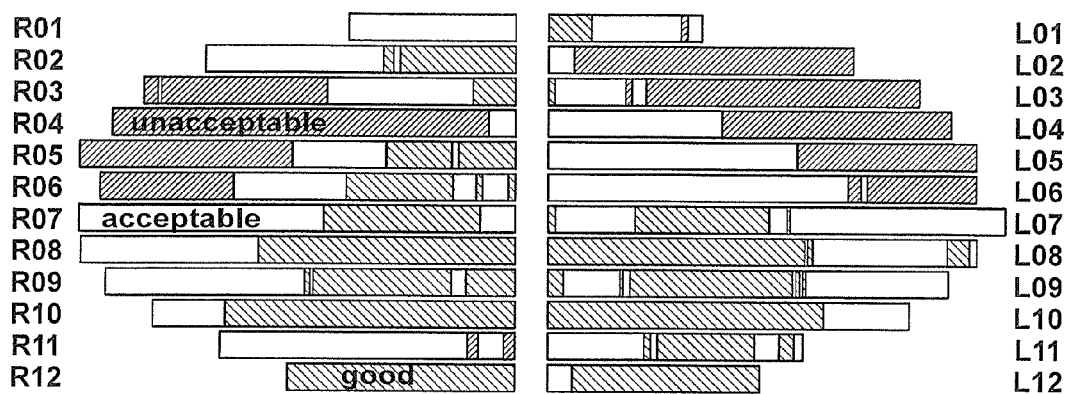
FIG. 8 illustrates differences between a conventional "scanner alignment" and a manually-derived reference alignment.
Figure 9:
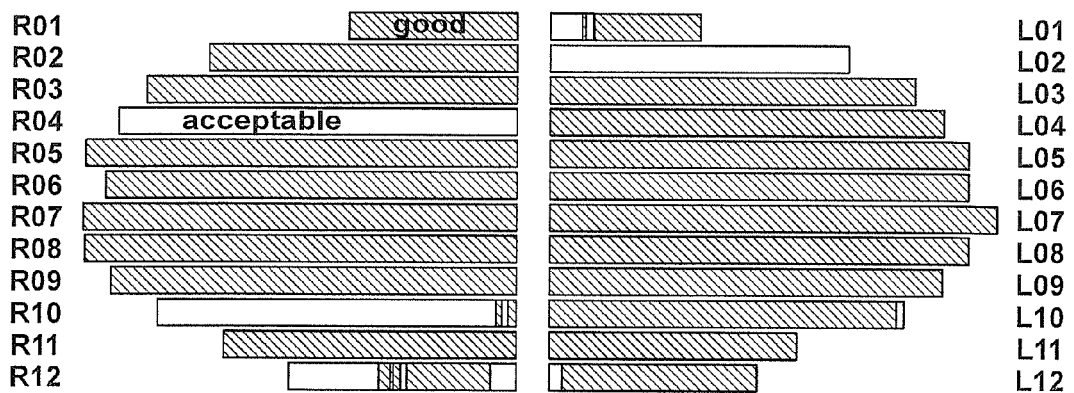
FIG. 9 illustrates differences between a conventional "scanner alignment" and a manually-derived reference alignment.

FIGS. 8 and 9 respectively illustrate evaluations of differences between the alignment provided by the conventional method of FIG. 6 and a manually derived reference alignment (FIG. 8); and an alignment provided according to the present invention and the manually derived reference alignment (FIG. 9). FIGS. 8 and 9 indicate, by appropriate shadings, whether the differences are "good" (in this example, defined as a misalignment of 4.5 mm or less), "acceptable" (in this example, defined as a misalignment of between 4.5 mm and 9 mm), or "unacceptable" (in this example, defined as a misalignment of more than 9 mm). These thresholds may be defined so that "good" alignment provides unambiguous association to the corresponding anatomical location, while "unacceptable" alignment may allow a lesion to be completely missed.

The alignment provided by the conventional method (FIG. 6), illustrated in FIG. 8, shows significant regions of unacceptable alignment. Notably, regions of unacceptable alignment correspond to rib regions where lesion A was misplaced in FIG. 6 and lesion C was omitted completely. The alignment provided by the method of the present invention (FIG. 7), illustrated in FIG. 9, is much improved, with all parts of all regions being of good or acceptable alignment. Ribs R10 and R12, individually, show a degraded alignment in FIG. 9 according to the present invention, but overall alignment is much improved.

The methods of the present invention may be performed by an apparatus comprising a suitably programmed computer, which is conventional in all other ways.

Figure 10:
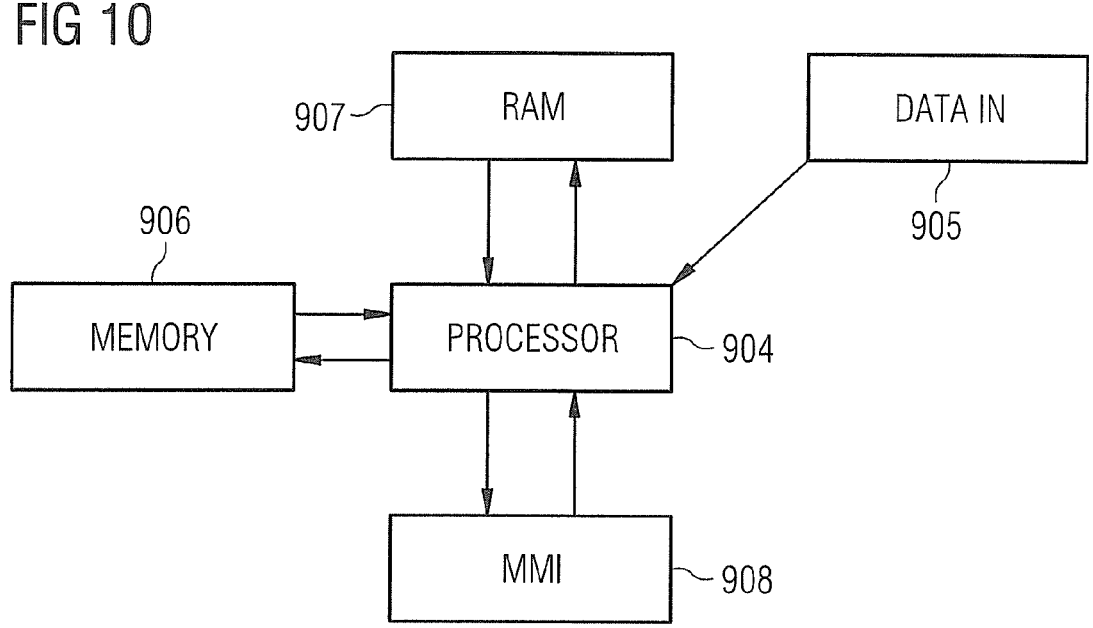
FIG. 10 illustrates an apparatus according to an embodiment of the invention.

Referring to FIG. 10, the above embodiments of the invention may be conveniently realized as a computer system suitably programmed with instructions for carrying out the steps of the methods according to the invention.

For example, a central processing unit 904 is able to receive data representative of medical scan images via a port 905 which could be a reader for portable data storage media (e.g. CD-ROM); a direct link with apparatus such as a medical scanner (not shown) or a connection to a network.

Software applications loaded on memory 906 are executed to process the image data in random access memory 907.

The processor 904 in conjunction with the software can perform the steps such as determining a feature of interest in the imaging data elongate in at least one dimension, obtaining a location of a centerline through the imaging data along the feature of interest, and calculating improved image alignment.

A Man-Machine interface 908 typically includes a keyboard/mouse/screen combination which allows user input and a screen on which the results of executing the applications are displayed.

Although modifications and changes may be suggested by those skilled in the art, it is the intention of the inventors to embody within the patent warranted hereon all changes and modifications as reasonably and properly come within the scope of their contribution to the art.

We claim as our invention:

1. A method for improving alignment between representations of a same elongated anatomical feature in a first image and a second image, comprising:

providing a computerized processor with image data representing a first image and a second image of a subject, each of said first and second images containing the same elongated anatomical feature of the subject therein;

in said processor, automatically calculating a centerline from image data representing the elongated anatomical feature in the first image;

without making any change to said image data in said second image, automatically evaluating in said processor, alignment of the calculated centerline with image data at respective positions in the second image at which actual image data in said second image represent the same elongated anatomical feature by, for each respective position, deriving a value of a metric that indicates a quality of alignment of the calculated centerline with said image data at that respective position in the second image;

in said processor, automatically optimizing the metric to provide a rigid transform between said first and second images;

in said processor, automatically applying the rigid transform to the calculated centerline, or to the second image, to produce an improved alignment between the first and second images with respect to the elongated anatomical feature; and making the first and second images available at an output of the processor in an electronic form allowing a visual presentation of said first and second images at a display with said improved alignment with respect to said elongated anatomical feature.

2. A method according to claim 1, comprising, in said processor:

(a) identifying seed points at intervals along the calculated centerline;

(b) using an initial alignment between said first and second images, at each of the seed points, sampling the data of the second image in the vicinity of the calculated centerline;

(c) calculating an indication of the quality of the alignment between the calculated centerline and the data sample of the second image at each seed point;

(d) using an optimization method to calculate a rigid transformation which, when applied to the second image or the calculated centerline, increases the indication of the quality of the alignment between the data of the second image and the calculated centerline, along the length of the calculated centerline; and (e) applying the calculated rigid transformation, as said rigid transform, to the second image or the centerline.

3. A method according to claim 2, wherein step (b) comprises sampling the data of the second image in at least one direction perpendicular to the centerline.

4. A method according to claim 2, comprising executing (d) and (e) iteratively until an end point is reached.

5. A method according to claim 4, comprising selecting the end point from the group consisting of a minimum or maximum value of the indication of the quality, an improvement in the value of the indication of the quality between one iteration and the next falling below a certain minimum value, and a predetermined number of iterations.

6. A method according to claim 2 wherein step (c) comprises convolving the data sample with a matched filter.

7. A method according to claim 2 comprising, at each seed point, taking a plurality of one dimensional data samples of the second image data in respective directions extending from the calculated centerline, calculating an indication of the quality of the alignment between the calculated centerline and each data sample of the second image at each seed point, and using all of said indications in the optimization method.

8. A method according to claim 7, wherein the respective directions extend perpendicularly to the calculated centerline.

9. A method according to claim 2 wherein each of the first and second images comprises multiple elongated anatomical features, and executing (a) to (e) in said processor for each elongated anatomical feature separately and independently of the other elongate features in the first and second images.

10. A method according to claim 9 wherein each elongated anatomical feature is a rib.

11. A method according to claim 10, comprising:
applying a calculated improvement in alignment of one rib to a neighboring rib, to provide an improved initial alignment for improvement of alignment of the respective representations of the neighboring rib in said first and second images.

12. A method according to claim 11, comprising:
calculating improvements to alignments of respective representations of each of further ribs in said first and second images, and applying each improvement to a neighboring rib as an initial alignment of the respective representations of the neighboring rib in first and second images.

13. A method according to claim 10, comprising, in said processor:
calculating respective calculated centerlines from image data representing each of the ribs in the first image;
for each calculated centerline, deriving a value of said metric indicating a present quality of alignment of the respective calculated centerline with image data of the second image representing a same rib;
optimizing the derived metrics to provide said rigid transform; and
applying the rigid transform to the calculated centerlines or the second image to improve the alignment between the first and the second image with respect to the plurality of ribs.

14. A method according to claim 10 wherein said first and second image each represent a group of ribs, and said method comprising, in said processor:
dividing the alignment of the representations of an entity of the group of ribs in the first image with an entirety of the group of ribs in the second image;
dividing each group of ribs into subsets of ribs; and
improving the alignment of the representations of each subset of ribs.

15. A method according to claim 14 comprising iteratively dividing each subset of ribs into smaller subsets of ribs, and improving the alignment of the representations of each smaller subset of ribs, with a starting point for each improvement being provided by the improved alignment of the previous iteration.

16. A method according to claim 9 wherein each elongated anatomical feature is a segment of a blood vessel.

17. A method according to claim 16 wherein each elongated anatomical feature is a segment of the aorta.

18. A method according to claim 1, wherein the indication of the quality comprises an energy function and, in the optimization method, optimizing the value of the energy function along the length of the calculated centerline of the elongated structure.

19. A method according to claim 18 wherein the energy function comprises:

$$E(A) = \sum_{p \in A} \frac{1}{\max_{i,m} I(p, v_i, m)} \sum_{i=1}^{N} \sum_{m=-L/2}^{L/2} I(p, v_i, m) h_\sigma(-m)$$

wherein
p represents each seed point on the calculated centerline,
A is the locus of three dimensions of said calculated centerline,
I represents intensity of image data,
N is the number of directions in which data are sampled at each seed point,
m indicates a position along the data sample,
$v_i$ represents the orientation of the data sample,
L+1 is the length of the data sample,
$h_\sigma$ is a matched filter, and
p∈A means that A is the set containing all of the points p.

20. A method according to claim 19 wherein $h_\sigma$ is represented by a Gaussian kernel or its derivatives with a zero mean and a variance of $\sigma^2$.

21. A method according to claim 1 wherein the first image comprises anatomical data and the second image comprises functional data.

22. A method according to claim 21 wherein the first image is generated by a CT scan and the second image is generated by a PET scan.

23. A method according to claim 22 wherein the first image and the second image are acquired during a same pass of a combined PET/CT scanner.

24. A method according to claim 21 wherein the first image is generated by a CT scan and the second image is generated by a SPECT scan.

25. A method according to claim 24 wherein the first image and the second image are acquired during a same pass of a combined SPECT/CT scanner.

26. A method as claimed in claim 1 comprising providing said output of said processor in said electronic form to a display device and, at said display device, displaying said visual presentation of said first and second images with said improved alignment of said elongated anatomical feature.

27. An apparatus for improving alignment between representations of a same elongated anatomical feature in a first image and a second image, comprising:
a computerized processor provided with image data representing a first image and a second image of a subject, each of said first and second images containing the same elongated anatomical feature of the subject therein;
said processor being configured to automatically calculate a centerline from image data representing the elongated anatomical feature in the first image;
without making any change to said image data in said second image, said processor being configured to automatically evaluate alignment of the calculated centerline with said image data at respective positions in the second image at which said image data in said second image represent the same elongated anatomical feature by, for each respective position, deriving a value of a metric that indicates a quality of alignment of the calculated centerline with said image data at that respective position in the second image;
said processor being configured to automatically optimize the metric to provide a rigid transform between said first and second images;
said processor being configured to automatically apply the rigid transform to the calculated centerline, or to the second image, to produce an improved alignment between the first and second images with respect to the elongated anatomical feature; and said processor being configured to make the first and second images available at an output of the processor in an electronic form allowing a visual presentation of said first and second images at a display with said improved alignment with respect to said elongated anatomical feature.

28. A non-transitory, computer-readable data storage medium encoded with programming instructions, said storage medium being loaded into a computerized processor and said programming instructions causing said computerized processor to:

receive image data representing a first image and a second image of a subject, each of said first and second images containing the same elongated anatomical feature of the subject therein;

calculate a centerline from image data representing the elongated anatomical feature in the first image;

without making any change to said image data in said second image, evaluate a present quality of alignment of the calculated centerline with image data at respective positions in the second image at which said image data in said second image represent the same elongated anatomical feature;

for each respective position, derive a value of a metric that indicates a quality of alignment of the calculated centerline with said image data at that respective position in the second image;

optimize the metric to provide a rigid transform between said first and second images;

apply the rigid transform to the calculated centerline, or to the second image, to produce an improved alignment between the first and second images with respect to the elongated anatomical feature; and make the first and second images available at an output of the processor in an electronic form allowing a visual presentation of said first and second images at a display with said improved alignment with respect to said elongated anatomical feature.

* * * * *